(12) United States Patent
Ferris et al.

(10) Patent No.: US 9,529,689 B2
(45) Date of Patent: Dec. 27, 2016

(54) MONITORING CLOUD COMPUTING ENVIRONMENTS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 829 days.

(21) Appl. No.: 12/627,764

(22) Filed: Nov. 30, 2009

(65) Prior Publication Data

US 2011/0131499 A1    Jun. 2, 2011

(51) Int. Cl.
| | | |
|---|---|---|
| G06F 11/34 | (2006.01) | |
| H04L 12/24 | (2006.01) | |
| G06F 3/06 | (2006.01) | |
| G06F 17/30 | (2006.01) | |
| G06F 9/44 | (2006.01) | |
| G06F 3/0481 | (2013.01) | |

(52) U.S. Cl.
CPC ......... *G06F 11/3466* (2013.01); *G06F 3/0481* (2013.01); *G06F 3/067* (2013.01); *G06F 9/4445* (2013.01); *G06F 17/30873* (2013.01); *H04L 41/22* (2013.01); *G06F 11/3409* (2013.01); *G06F 2201/815* (2013.01); *G06F 2201/865* (2013.01); *G06F 2201/875* (2013.01)

(58) Field of Classification Search
CPC .. G06F 3/067; G06F 3/0601; G06F 17/30873; G06F 3/0481; G06F 9/4445; H04L 41/22
USPC ........ 715/734–739, 748–749, 740, 741–743; 717/140, 171, 172, 173; 726/7
See application file for complete search history.

(56) References Cited

U.S. PATENT DOCUMENTS

| | | |
|---|---|---|
| 6,463,457 B1 | 10/2002 | Armentrout et al. |
| 6,567,107 B1 | 5/2003 | Stannard |
| 6,903,755 B1 * | 6/2005 | Pugaczewski et al. ....... 715/735 |
| 7,249,060 B2 | 7/2007 | Ling |
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 8,078,728 B1 * | 12/2011 | Pollan et al. ................. 709/226 |
| 8,166,132 B1 | 4/2012 | Mooneyham |

(Continued)

FOREIGN PATENT DOCUMENTS

CN    101964707 A  *  2/2011

OTHER PUBLICATIONS

Virtualization vs. Cloud Computing, Business News Daily, Jan. 2014.*

(Continued)

*Primary Examiner* — Steven Sax
(74) *Attorney, Agent, or Firm* — Lowenstein Sandler LLP

(57) ABSTRACT

A monitoring system can provide monitoring services to users of cloud computing environment. The monitoring system can receive access information from users subscribing to the monitoring services. Once received, the monitoring system can access clouds utilizing the access information and monitor the computing processes instantiated in the clouds and associated with the user. The monitoring system can monitor the computing processes and collect information such as usage of cloud resources, number and type of computing processes instantiated, software programs utilized by the computing processes.

20 Claims, 6 Drawing Sheets

(56) References Cited

U.S. PATENT DOCUMENTS

| | | | |
|---|---|---|---|
| 8,255,829 B1* | 8/2012 | McCormick | G06Q 10/10 705/7.11 |
| 8,307,177 B2* | 11/2012 | Prahlad et al. | 711/162 |
| 8,352,012 B2* | 1/2013 | Besio | A61B 5/04004 600/383 |
| 8,370,628 B2* | 2/2013 | Mundy | G06F 21/6209 707/608 |
| 8,474,027 B2* | 6/2013 | Meijer | H04L 63/0807 726/10 |
| 8,478,823 B2* | 7/2013 | Fein | H04L 67/327 709/205 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0042470 A1* | 3/2004 | Cooper et al. | 370/401 |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0075115 A1 | 4/2005 | Corneille et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0143452 A1 | 6/2007 | Suenbuel et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0201645 A1* | 8/2008 | Francis et al. | 715/742 |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0036111 A1* | 2/2009 | Danford et al. | 455/419 |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222551 A1* | 9/2009 | Neely et al. | 709/224 |
| 2009/0222805 A1 | 9/2009 | Faus et al. | |
| 2009/0228950 A1 | 9/2009 | Reed et al. | |
| 2009/0228967 A1* | 9/2009 | Gbadegesin | H04L 63/0807 726/8 |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1* | 11/2009 | Nickolov et al. | 717/177 |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1* | 12/2009 | Ferris | 709/235 |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0011368 A1* | 1/2010 | Arakawa | G06F 3/0604 718/104 |
| 2010/0042720 A1* | 2/2010 | Stienhans et al. | 709/226 |
| 2010/0050172 A1 | 2/2010 | Ferris | |
| 2010/0057658 A1* | 3/2010 | Fein | G06Q 30/02 706/46 |
| 2010/0057831 A1 | 3/2010 | Williamson | |
| 2010/0058347 A1 | 3/2010 | Smith et al. | |
| 2010/0083303 A1 | 4/2010 | Redei et al. | |
| 2010/0088205 A1* | 4/2010 | Robertson | 705/34 |
| 2010/0125612 A1* | 5/2010 | Amradkar | H04L 63/105 707/802 |
| 2010/0125664 A1* | 5/2010 | Hadar et al. | 709/224 |
| 2010/0125669 A1* | 5/2010 | Esfahany et al. | 709/228 |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0154045 A1* | 6/2010 | Pairault et al. | 726/8 |
| 2010/0169477 A1 | 7/2010 | Stienhans et al. | |
| 2010/0205541 A1* | 8/2010 | Rapaport et al. | 715/753 |
| 2010/0220622 A1 | 9/2010 | Wei | |
| 2010/0241980 A1* | 9/2010 | Sosnosky | G06F 3/0486 715/769 |
| 2010/0287280 A1* | 11/2010 | Sivan | G06F 9/5072 709/226 |
| 2010/0299366 A1 | 11/2010 | Stienhans et al. | |
| 2010/0306566 A1* | 12/2010 | Dehaan et al. | 713/330 |
| 2011/0016214 A1* | 1/2011 | Jackson | G06F 9/5044 709/226 |
| 2011/0029887 A1* | 2/2011 | Pearson | G06Q 10/10 715/743 |
| 2011/0055378 A1* | 3/2011 | Ferris | G06F 11/3419 709/224 |
| 2011/0055385 A1* | 3/2011 | Tung et al. | 709/224 |
| 2011/0055707 A1* | 3/2011 | Kimmet | 715/735 |
| 2011/0055712 A1* | 3/2011 | Tung et al. | 715/738 |
| 2011/0055714 A1* | 3/2011 | Vemulapalli et al. | 715/739 |
| 2011/0106926 A1* | 5/2011 | McClain | H04L 67/1097 709/223 |
| 2011/0131335 A1 | 6/2011 | Spaltro et al. | |
| 2011/0131499 A1 | 6/2011 | Ferris et al. | |
| 2011/0213687 A1 | 9/2011 | Ferris et al. | |
| 2011/0214124 A1 | 9/2011 | Ferris et al. | |
| 2013/0167128 A1* | 6/2013 | Narayana Iyer et al. | 717/143 |

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

(56) References Cited

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, flied May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Loud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a_Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.

(56) References Cited

OTHER PUBLICATIONS

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

USPTO Non Final Office Action for U.S. Appl. No. 12/714,334 mailed Nov. 3, 2014.

USPTO Non Final Office Action for U.S. Appl. No. 12/714,334 mailed Jan. 31, 2012.

USPTO Final Office Action for U.S. Appl. No. 12/714,334 mailed Mar. 10, 2015.

USPTO Final Office Action for U.S. Appl. No. 12/714,334 mailed May 17, 2012.

USPTO Advisory Action for U.S. Appl. No. 12/714,334 mailed May 27, 2015.

USPTO Non Final Office Action for U.S. Appl. No. 12/714,315 mailed Nov. 3, 2014.

USPTO Non Final Office Action for U.S. Appl. No. 12/714,315 mailed Feb. 9, 2012.

USPTO Final Office Action for U.S. Appl. No. 12/714,315 mailed Mar. 16, 2015.

USPTO Final Office Action for U.S. Appl. No. 12/714,315 mailed May 23, 2012.

USPTO Advisory Action for U.S. Appl. No. 12/714,315 mailed May 27, 2015.

\* cited by examiner

REPORT USER 310

CLOUD 304 :         CURRENT FEE      $3,000.00

COMPUTING PROCESSES 316
    - VIRTUAL MACHINE 0001 -  30 HOURS
       - RHEL V.3
       - EMAIL SERVER V1
    - VIRTUAL MACHINE 0002 -  25 HOURS
       - RHEL V.3
       - WEB SERVER V1

CLOUD 306 :         CURRENT FEE      $15,000.00

COMPUTING PROCESSES 318
    - VIRTUAL MACHINE 0001 -  50 HOURS
       - RHEL V.3
       - EMAIL SERVER V1
    - SOFTWARE APPLIANCE -  50 HOURS
       - RHEL V.3
       - APPLICATION SERVER

MONITORING CLOUD COMPUTING ENVIRONMENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, when a user utilizes a cloud, the user must track the processes instantiated in the cloud. For example, the user must track the cloud processes to ensure that the correct cloud processes have been instantiated, that the cloud processes are functioning properly, etc. Due to the user's requirements and usage of the cloud, the user may have many processes instantiated in a cloud and may be utilizing multiple independent clouds to support the cloud processes. As such, the user may have difficulty tracking the virtual machines over time.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4 illustrates an exemplary report generated by the monitoring system, according to various embodiments;

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for independently monitoring cloud computing environments. More particularly, embodiments relate to platforms and techniques in which a monitoring system can monitor the cloud computing environments for users.

According to embodiments, a monitoring system can be configured to provide monitoring services to users of cloud computing environment. In particular, the monitoring system can be configured to receive access information from users subscribing to the monitoring services. Once received, the monitoring system can be configured to access clouds utilizing the access information and monitor the computing processes instantiated in the clouds and associated with the user. The monitoring system can be configured to monitor the computing processes and collect information such as usage of cloud resources, number and type of computing processes instantiated, software applications utilized by the computing processes, and the like.

According to embodiments, once the information is collected, the monitoring system can be configured to store the collected information associated with the user's access information. Likewise, the monitoring system can be configured to provide reports to the user describing the information collected about the processes instantiated in the cloud.

By providing monitoring services, the monitoring system can enable the user to track computing processes instantiated in clouds without devoting time and manpower to tracking the computing processes. As such, the user can ensure that computing processes in the cloud are instantiated and running properly.

Figure 1:
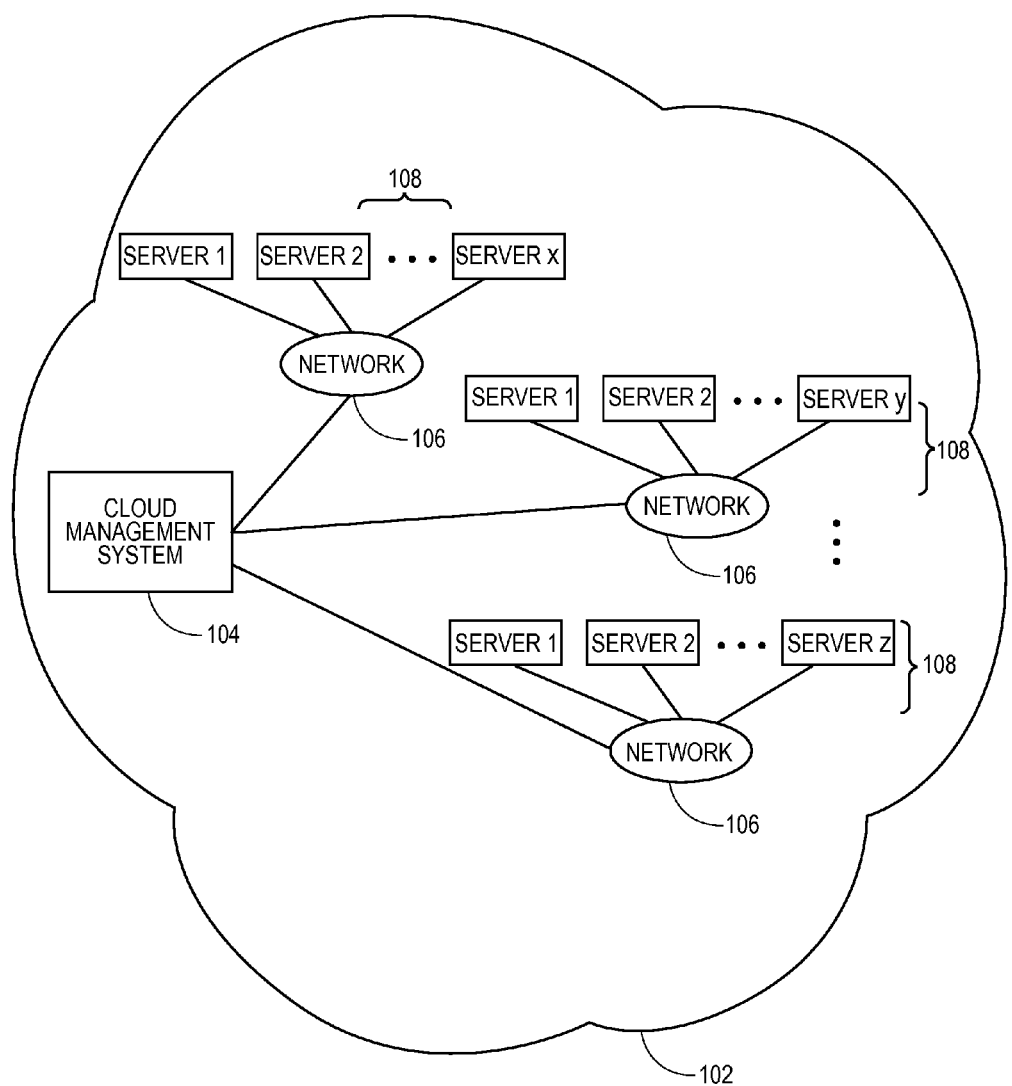
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
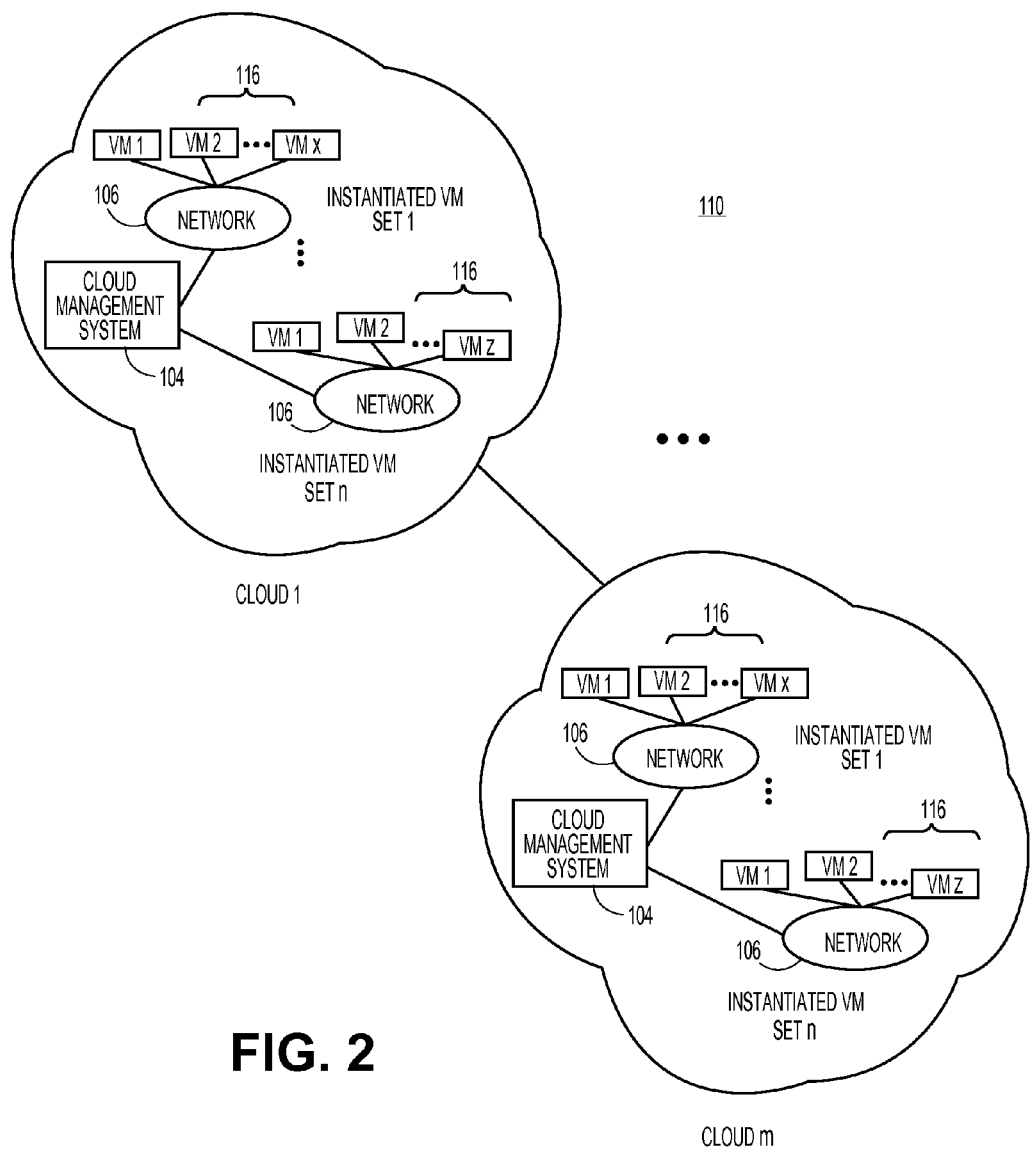
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
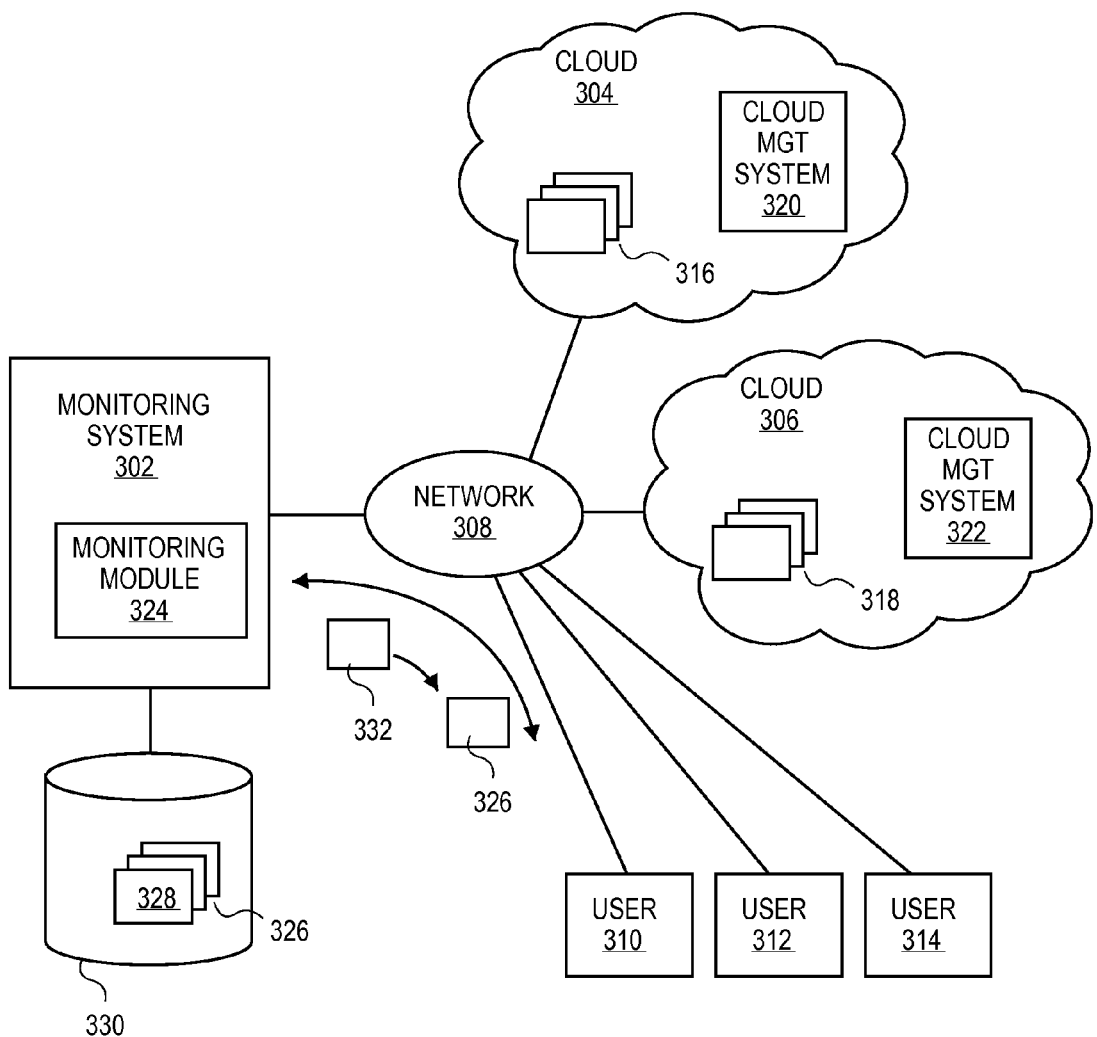
FIG. 3 illustrates an overall system in which a monitoring system can provide monitoring services to users of multiple clouds, according to various embodiments.

FIG. 3 illustrates aspects in which a monitoring system 302 can communicate with clouds 304 and 306, via one or more networks 308, according to various embodiments. While FIG. 3 illustrates various components of the monitoring system 302 and the clouds 304 and 306, one skilled in the art will realize that components can be added or removed.

In embodiments, one or more users 310, 312, and 314 can utilize one or more of the clouds 304 and 306 to support computing processes of the user 310, 312, and 314. For example, the user 310 can utilize the cloud 304 to support computing processes 316 and can utilize cloud 306 to supporting computing processes 318. The computing processes 316 and 318 can be any type of computing processes, such as virtual machines, software appliances, software programs, etc. The users 310, 312, and 314 can be any type of entity, such as individual users, corporations, companies, universities, and the like, that utilizes the clouds 304 and 306 to support computing processes. While FIG. 3 will be described with reference to user 310, one skilled in the art will realize that the processes and methods can be applied to any of the users 310, 312, and 314 or any other users. Additionally, while FIG. 3 illustrates users 310, 312, and 314, one skilled in the art will realize that methods and processes can apply to any number of users.

In embodiments, the clouds 304 and 306 can be any type of cloud computing environments, such as the cloud computing environments described above in FIGS. 1 and 2. As described above, the clouds 304 and 306 can include any number of computing systems to support the computing processes in the cloud. The computing systems can be any type of computing systems capable of supporting computing processes, such as servers, laptops, desktops, and the like. The computing systems can include a number of hardware resources, which are used to support the computing processes (e.g. virtual machines, software appliances, processes and the like) in the clouds 304 and 306, such as processors, memory, network hardware and bandwidth, storage devices, etc. Additionally, the clouds 304 and 306 can include a cloud management system 320 and 322, respectively. The cloud management systems 320 and 322 can be supported by the computing resources of the clouds 304 and 306, respectively.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the the cloud 304 and/or the cloud 306 to subscribers and customers. Likewise, for example, the cloud 304 and/or the cloud 306 can be owned and/or operated by one or more of the users 310, 312 and 314, and the resources of the the cloud 304 and/or the cloud 306 can be used by the entity, internally, to support various computing processes. As such, in either case, the cloud 304 and the cloud 306 can be configured to include hardware, described above, and software resources to support computing processes. For example, if the cloud 304 and/or the cloud 306 is operated by a cloud vendor, the software resources can include operating systems, such as a distribution of Linux provided by Red Hat™ Corporation, and various application programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks. The one or more or more networks 308 can be or include wired, wireless, optical, and other network connections. One skilled in the art will realize that the one or more networks 308 can be any type of network, utilizing any type of communication protocol, to connect the computing systems.

In embodiments, due to the dynamics of the computing processes 316 and 318, the user 310 can desire to actively monitor the computing processes 316 and 318. For instance, the user 310 can desire to monitor the computing processes 316 and 318 to ensure that the appropriate computing processes are running and functioning properly. Likewise, the user 310 can desire to monitor the computing processes 316 and 318 to determine the usage of the resources of the clouds 304 and 306 for billing and other purposes. Additionally, the computing processes 316 and 318 can spawn new computing processes in the clouds 304 and 306, which the user 310 can desire to monitor.

In embodiments, the monitoring system 302 can be configured to monitor the clouds 304 and 306 for the one or more users 310, 312, and 314. In particular, the monitoring system 302 can be configured to monitor the computing process associated with the users 310, 312, and 314 and supported by the clouds 304 and 306. The monitoring system 302 can be configured to subscribe the users 310, 312, and 314 to the monitoring services provided by the monitoring system 302. Once subscribed, the monitoring system 302 can be configured to receive access information from the users 310, 312, and 314. The monitoring system 302 can be configured to utilize the access information to access and communicate with the clouds 304 and 306 in order to monitor the computing processes supported by the clouds 304 and 306 and to collect information about the computing processes. Additionally, the monitoring system 302 can be configured to report any information collected during the monitoring to the users 310, 312, and 314.

In embodiments, the monitoring system 302 can be operated by an entity that provides the monitoring services to the users 310, 312, and 314. The monitoring services can be provided to the users 310, 312, and 314 at a fee. The monitoring system 302 can be supported by one or more computing systems, such as servers, laptops, desktops, and the like. The monitoring system 302 can include conventional components of a computing system, such as such as processors, memory, network interfaces, storage devices, etc.

In embodiments, to provide the monitoring services, the monitoring system 302 can be configured to include a monitoring module 324. The monitoring module 324 can be configured to cooperate and communicate with the users 310, 312, and 314 to subscribe the user 310, 312, and 314 to the monitoring services and to report any gathered information to the users 310, 312, and 314. Likewise, the monitoring module 324 can be configured to cooperate and communicate with the clouds 304 and 306 to monitor computing processes supported by the cloud 304 and 306. The monitoring module 324 can be implemented as a software program that is configured to execute on the monitoring system 302. Likewise, the monitoring module 324 can be implemented as a portion of other software programs configured to execute on the monitoring system 302. In either case, the monitoring module 324 can be configured to include the necessary logic, commands, instructions, and protocols to perform the processes described below. In any implementation, the monitoring module 324 can be written in any type of conventional programming language such as C, C++, JAVA, Perl, and the like. Additionally, the monitoring module 324 can be stored in computer readable storage devices or media (CD, DVD, hard drive, portable storage memory, etc.) whether local to the monitoring system 302 or remotely located.

In embodiments, to subscribe the user 310 to the monitoring services, the monitoring module 324 can be configured to provide an interface 326 to receive a request for the monitoring services. The interface 326 can be configured to provide the details and terms of the monitoring services (monitoring services offered, fee, etc.). Likewise, if the user 310 accepts the offer of monitoring services, the interface 326 can be configured to receive, from the user 310, access information to the clouds 304 and 306, which the user 310 utilizes for the computing processes 316 and 318. To achieve this, the monitoring module 324 can be configured to include the necessary logic, commands, instructions, and protocols to generate and provide the interface 326, such as command line or graphical user interfaces (GUIs), to receive the request for the monitoring services. The monitoring module 324 can be configured to provide the interface 326 to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol. Likewise, the monitoring module 324 can be configured to allow software programs executing on the computing systems of the user 310 to provide the request. The monitoring module 324 can be configured to include an application programming interface (API) to provide the interface 326 that allows software programs of the user 310 to call the monitoring module 324 and provide the request.

In embodiments, the request can include access information required to access the clouds 304 and 306 in order to monitor the computing process 316 and 318. For example, if the cloud 304 is operated by a cloud vendor, the access information can include identification of the cloud (name of the vendor, type of cloud, the user 310 account number, network address of the cloud, etc.) and the log-in and password to gain access to the account of the user 310. Likewise, if the cloud 306 is operated by the user 310, the access information can include the network addresses (Internet Protocol (IP) address ranges, domain ranges of the cloud, etc.) and log-in and password, if necessary.

In embodiments, once the user 310 has subscribed, the monitoring module 324 can be configured to generate and maintain a set 326 of user records 328. Each user record 328 in the set 326 can be configured to store an identification of the user 310, the access information for the clouds associated with the user 310, and any information collected during the monitoring of the computing processes 316 and 318. The monitoring module 324 can maintain the set 326 of user records 328 in a repository 330, such as a database. The repository 330 can be stored in computer readable storage devices or media (CD, DVD, hard drive, portable storage memory, etc.) whether local to the monitoring system 302 or remotely located.

In embodiments, once the user 310 is subscribed, the monitoring module 324 can be configured to communicate with the clouds 304 and 306 to monitor the computing processes 316 and 318. For example, the monitoring module 324 can be configured to retrieve the access information from the user record 328 associated with the user 310 in order to access the computing processes 316 and 318 associated with the user 310. To retrieve the user record 328, the monitoring module 324 can be configured to include the necessary logic, commands, instructions, and protocols to search the set 326 of user records 328 and to retrieve the user record 328 and the access information for the user 310. For instance, the monitoring module 324 can be configured to include the necessary queries and commands to communicate with and retrieve information from the repository 330.

In embodiments, once the access information is retrieved, the monitoring module 324 can be configured to access the clouds 304 and 306 and to monitor the computing processes 316 and 318 in order to collect information about the computing processes. The monitoring module 324 can be configured to monitor the computing processes 316 and 318 and collect information such as usage of cloud resources by the computing processes 316 and 318, details of the computing processes 316 and 318, and the like. For example, for usage of the cloud resources, the monitoring module 324 can be configured to collect information, such as type and number of hardware resources of the clouds 304 and 306 utilized by the computing processes 316 and 318 (amount of processing cycles utilized, amount of network bandwidth utilized, amount of storage space utilized, amount of memory utilized, etc.), the type and number of software resources of the clouds 304 and 306 utilized by the computing processes 316 and 318, the duration the hardware and software resources are utilized, the current fees for using the clouds 304 and 308, and the like. Additionally, for example, the monitoring module 324 can be configured to collect information about details of the computing processes 316 and 318, themselves, such as number and type of the computing processes 316 and 318 instantiated, start time and duration of the computing processes 316 and 318, software programs utilized by the computing processes 316 and 318, and the like.

In embodiments, in order to monitor and collect information about the computing processes 316 and 318, the monitoring module 324 can be configured to communicate with the cloud management systems 320 and 322 of the clouds 304 and 306, respectively. For example, the monitoring module 324 can be configured to communicate with the cloud management systems 320 and 322 in order to collect information about the usage of the clouds 304 and 306. Likewise, the monitoring module 324 can be configured to communicate with the computing processes 316 and 318 to collect information about the details of the computing processes 316 and 318. For example, the monitoring module 324 can be configured to communicate with virtual machine monitors supporting virtual machines, with the virtual machines directly, with software appliances, with the software programs, and the like.

In embodiments, to communicate with the clouds 304 and 306, the monitoring module 324 can be configured to establish a connection with the cloud 304 and 306 via the network 308. In particular, the monitoring module 324 can be configured to establish a connection with the cloud management systems 320 and 322 and/or a connection to the computing processes 316 and 318. To achieve this,m the monitoring module 324 can be configured to include the necessary logic, instructions, commands, and protocols to communicate with the cloud management systems 320 and 322 and/or a connection to the computing processes 316 and 318 via network 308. For example, the monitoring module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the monitoring module 324 can be configured to monitor the computing processes 316 and 318 periodically and/or upon the occurrence of any events. For example, the monitoring module 324 can be configured to monitor the computing processes 316 and 318 upon the subscription of the user 310 and periodically (every hour, once a day, etc.) while the user 310 is subscribed.

In embodiments, once information about the computing processes 316 and 318 is collected, the monitoring module 324 can be configured to store the collected information in the user record 328 associated with the user 310. As such, the monitoring module 324 can be configured to classify the collected information and store the information in the user record 328. To achieve this, the monitoring module 324 can be configured to include the necessary logic, commands, instructions, and protocols to sort and classify the collected information and store the sorted and classified information in the user record 328.

In embodiments, when the information is collected, the monitoring module 324 can be configured to generate reports 332 to provide the collected information to the user 310. The monitoring module 324 can be configured to generate the report in any format to display the collected information to the user 310. To achieve this, the monitoring module 324 can include the necessary logic, commands, instructions, and protocols to retrieve the collected information from the user record 328 and organize the collected information into the report 332.

In embodiments, the monitoring module 324 can be configured to generate and provide the reports 332 to the user upon the occurrence of any number of events. For example, the monitoring module 324 can be configured to provide the reports upon request of the user 310 and/or periodically. The monitoring module 324 can be configured to receive the request for the report via the interface 326. Likewise, the monitoring module 324 can be configured to provide the reports 332 via the interface 326. Additionally, the monitoring module 324 can provide the reports to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol FIG. 4 illustrates an exemplary report 400, according to various embodiments. As illustrated in FIG. 4, the report 400 can include the information collected about the computing processes 316 and 318 supported by the clouds 304 and 306. The report 400 can include details about the usage of resources of the clouds 304 and 306 and the details of the computing processes 316 and 318.

Figure 5:
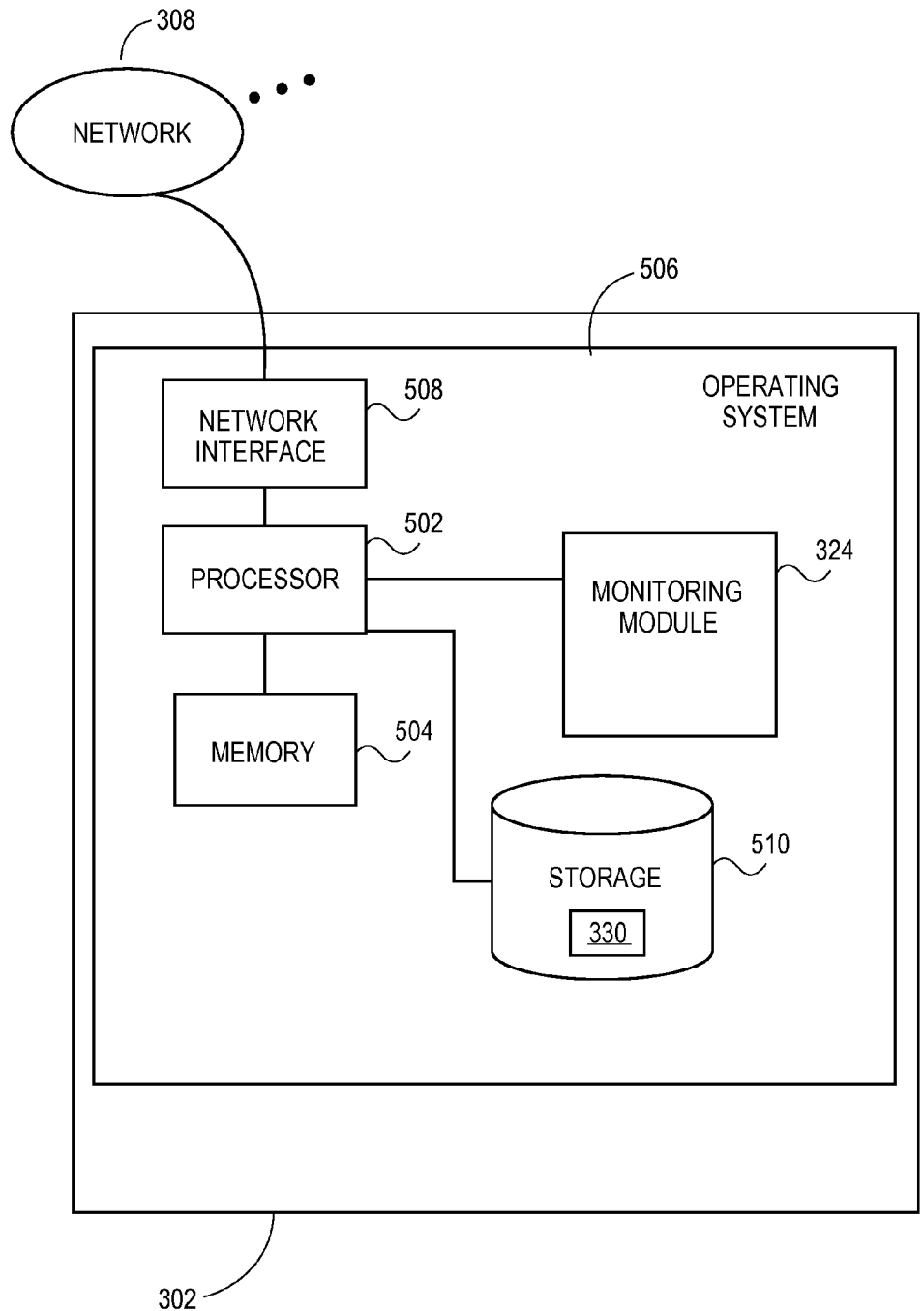
FIG. 5 illustrates an exemplary hardware configuration for a monitoring system, according to various embodiments.

FIG. 5 illustrates an exemplary diagram of hardware and other resources that can be incorporated in the monitoring system 302, which can implement monitoring module 324, and configured to communicate with the clouds 304 and 306 via one or more networks 308, according to embodiments. In embodiments as shown, the monitoring system 302 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 502 also communicates with one or more computer readable storage medium 510, such as hard drives, optical storage, and the like, which can store the repository 330. Processor 502 further communicates with network interface 508, such as an Ethernet or wireless data connection, which in turn communicates with one or more networks 308, such as the Internet or other public or private networks.

Processor 502 also communicates with the monitoring module 324 to execute control logic and allow for monitoring computing processes as described above and below. Other configurations of the monitoring system 302, associated network connections, and other hardware and software resources are possible.

While FIG. 5 illustrates the monitoring system 302 as a standalone system including a combination of hardware and software, the monitoring system 302 can include multiple systems operating in cooperation. The monitoring module 324 can be implemented as a software application or program capable of being executed by the monitoring system 302, as illustrated, or other conventional computer platforms. Likewise, the monitoring module 324 can also be implemented as a software module or program module capable of being incorporated in other software applications and programs. In either case, the monitoring module 324 can be implemented in any type of conventional proprietary or open-source computer language. When implemented as a software application or program code, the monitoring module 324 can be stored in a computer readable storage medium, such as storage 510 accessible by the monitoring system 302. Likewise, during execution, a copy of the monitoring module 324 can be stored in the memory 504.

Figure 6:
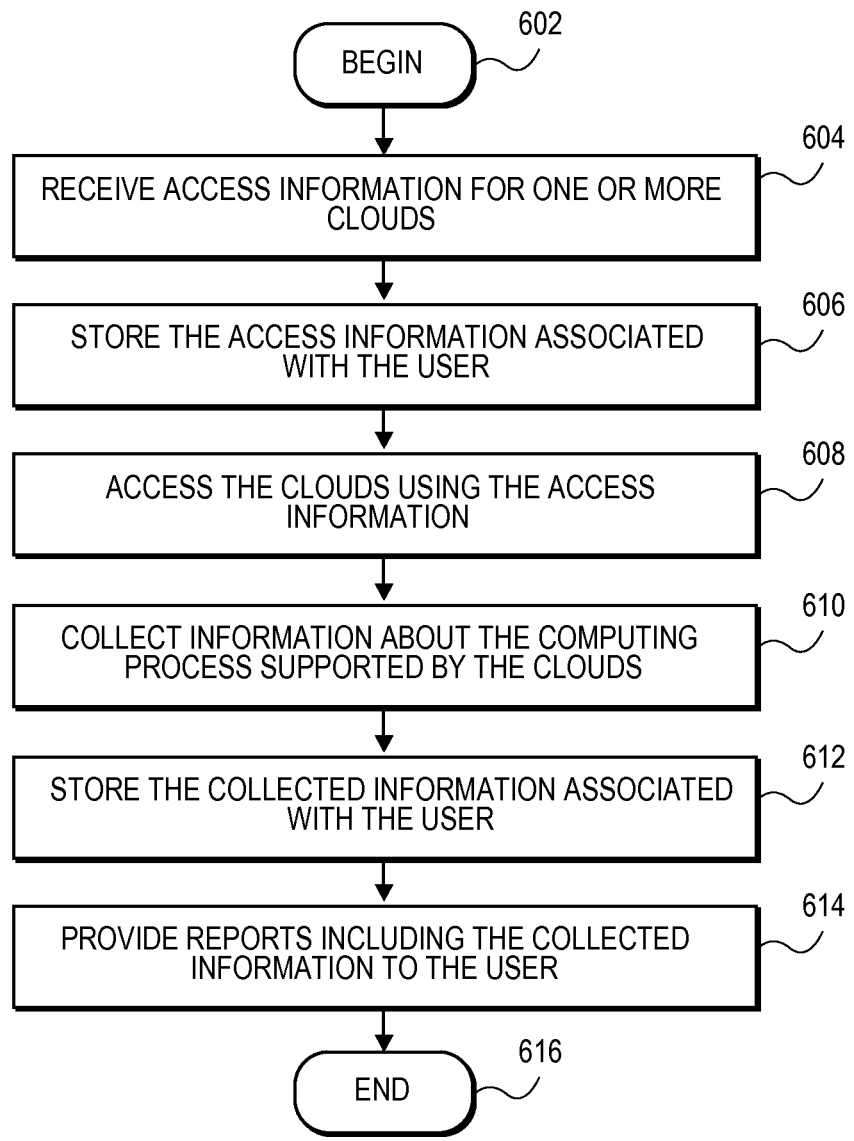
FIG. 6 illustrates a flowchart of an exemplary process for monitoring cloud computing environments, according to various embodiments.

FIG. 6 illustrates a flow diagram of an exemplary process for monitoring clouds, according to embodiments. In 602, processing can begin. In 604, the monitoring system 302 can receive access information for the clouds 304 and 306 to monitor for the user 310. For example, the monitoring system 302 can provide the interface 326 to receive the access information. The access information can include information required to access the clouds 304 and 306 in order to monitor the computing process 316 and 318. For example, if the cloud 304 is a operated by a cloud vendor, the access information can include identification of the cloud (name of the vendor, type of cloud, the user 310 account number, network address of the cloud, etc.) and the log-in and password to gain access to the account of the user 310. Likewise, if the cloud 306 is operated by the user 310, the access information can include the network addresses (Internet Protocol (IP) address ranges, domain ranges of the cloud, etc.) and log-in and password, if necessary.

In 606, the monitoring system 302 can store the access information associated with the user 310. For example, the monitoring system 302 can store the access information in a user record 328 associated with the user 310.

In 608, the monitoring system 302 can access the clouds 304 and 306 utilizing the access information. For example, the monitoring system 302 can establish a connection with the cloud 304 and 306 via the network 308. In particular, the monitoring system 302 can establish a connection with the cloud management systems 320 and 322 and/or a connection to the computing processes 316 and 318.

In 610, the monitoring system can collect information about the computing processes 316 and 318supported by the clouds 304 and 306. For example, the monitoring system 302 can collect information such as usage of cloud resources by the computing processes 316 and 318, details of the computing processes 316 and 318, and the like. For example, for usage of the cloud resources, the monitoring system 302 can collect information, such as type and number of hardware resources of the clouds 304 and 306 utilized by the computing processes 316 and 318 (amount of processing cycles utilized, amount of network bandwidth utilized, amount of storage space utilized, amount of memory utilized, etc.), the type and number of software resources of the clouds 304 and 306 utilized by the computing processes 316 and 318, the duration the hardware and software resources are utilized, the current fees for using the clouds 304 and 308, and the like. Additionally, for example, the monitoring system 302 can collect information about details of the computing processes 316 and 318, themselves, such as number and type of the computing processes 316 and 318 instantiated, start time and duration of the computing processes 316 and 318, software programs utilized by the computing processes 316 and 318, and the like.

In 612, the monitoring system 302 can store the collected information associated with the user 310. For example, the monitoring system 302 can store the collected information in the user record 328 associated with the user 310.

In 614, the monitoring system 302 can provide reports to the user 310 including the collected information. For example, the monitoring system 302 can generate reports 332 and provide the reports 332 to the user 310. The monitoring system 302 can provide the reports via the network 308.

In 616, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
receiving one or more requests from a user to subscribe to a monitoring service for a plurality of cloud computing systems comprising a plurality of virtual machines, wherein the one or more requests comprise access information for the plurality of cloud computing systems, wherein the access information comprises an identifier or address of each of the plurality of cloud computing systems and login information to access an account of the user at each of the plurality of cloud computing systems;
establishing connections to each of the plurality of cloud computing systems in view of the access information;
tracking a set of rights associated with the user for associated virtual machines of the plurality of virtual machines;
identifying, by a processor in view of the connections, usage information for each cloud computing system in the plurality of cloud computing systems in view of the set of rights associated with the user, wherein the usage information comprises types, durations, and fees for a plurality of computing processes that are executed by the account in the cloud computing system wherein the usage information comprises resource usage of the cloud computing system, wherein the resource usage for the user differs between the associated virtual machines; and
providing a report to the user, wherein the report comprises the usage information for each of the associated virtual machines of the plurality of cloud computing systems, individual resources for each of the plurality of cloud computing systems, and the plurality of computing processes that are executed.

2. The method of claim 1, further comprising storing the access information.

3. The method of claim 2, further comprising storing the usage information.

4. The method of claim 1, wherein the plurality of cloud computing systems comprise at least one of a subscription cloud or a cloud controlled by the user.

5. The method of claim 1, wherein the usage information further comprises at least one of, a number of the plurality of computing processes, or an identification of a plurality of software programs utilized by the plurality of computing processes.

6. The method of claim 1, further comprising providing an interface to receive the request.

7. The method of claim 1, wherein the plurality of computing processes comprise at least one of a virtual machine, a software appliance, or a software program.

8. A non-transitory computer readable storage medium having instructions stored therein that, when executed by a processor, cause the processor to:
receive one or more requests from a user to subscribe to a monitoring service for a plurality of cloud computing systems comprising a plurality of virtual machines, wherein the one or more requests comprise access information for the plurality of cloud computing systems, wherein the access information comprises an identifier or address of each of the plurality of cloud computing systems and login information to access an account of the user at each of the plurality of cloud computing systems;

establish connections to each of the plurality of cloud computing systems in view of the access information;

track a set of rights associated with the user for associated virtual machines of the plurality of virtual machines;

identify, by the processor in view of the connections, usage information for each cloud computing system in the plurality of cloud computing systems in view of the set of rights associated with the user, wherein the usage information comprises types, durations, and fees for a plurality of computing processes that are executed by the account in the cloud computing system, wherein the usage information comprises resource usage of the cloud computing system, wherein the resource usage for the user differs between the associated virtual machines; and provide a report to the user, wherein the report comprises the usage information for each of the associated virtual machines of the plurality of cloud computing systems, individual resources for each of the plurality of cloud computing systems, and the plurality of computing processes that are executed.

9. The non-transitory computer readable storage medium of claim 8, wherein the processor is further to store the access information.

10. The non-transitory computer readable storage medium of claim 9, wherein the processor is further to store the usage information.

11. The non-transitory computer readable storage medium of claim 8, wherein the plurality of cloud computing systems comprise at least one of a subscription cloud or a cloud controlled by the user.

12. The non-transitory computer readable storage medium of claim 8, wherein the usage information further comprises at least one a number of the plurality of computing processes, or an identification of a plurality of software programs utilized by the plurality of computing processes.

13. The non-transitory computer readable storage medium of claim 8, wherein the processor is further to provide an interface to receive the request.

14. The non-transitory computer readable storage medium of claim 8, wherein the plurality of computing processes comprise at least one of a virtual machine, a software appliance, or a software program.

15. A system comprising:
a network interface; and
a processor to communicate with the network interface to:
receive one or more requests from a user to subscribe to a monitoring service for a plurality of cloud computing systems comprising a plurality of virtual machines, wherein the one or more requests comprise access information for the plurality of cloud computing systems, wherein the access information comprises an identifier or address of each of the plurality of cloud computing systems and login information to access an account of the user at each of the plurality of cloud computing systems;

establish connections to each of the plurality of cloud computing systems in view of the access information;

track a set of rights associated with the user for associated virtual machines of the plurality of virtual machines;

identify, in view of the connections, usage information for each cloud computing system in the plurality of cloud computing systems in view of the set of rights associated with the user, wherein the usage information comprises types, durations, and fees for a plurality of computing processes that are executed by the account in the cloud computing system, wherein the usage information comprises resource usage of the cloud computing system, wherein the resource usage for the user differs between the associated virtual machines; and provide a report to the user, wherein the report comprises the usage information for each of the associated virtual machines of the plurality of cloud computing systems, individual resources for each of the plurality of cloud computing systems, and the plurality of computing processes that are executed.

16. The system of claim 15, wherein the processor is further to store the access information.

17. The system of claim 16, wherein the processor is further to store the usage information.

18. The system of claim 15, wherein the plurality of cloud computing systems comprise at least one of a subscription cloud or a cloud controlled by the user.

19. The system of claim 15, wherein the usage information further comprises at least one of a number of the plurality of computing processes, or an identification of a plurality of software programs utilized by the plurality of computing processes.

20. The system of claim 15, wherein the plurality of computing processes comprise at least one of a virtual machine, a software appliance, or a software program.

* * * * *